United States Patent [19]
Marey et al.

[11] 3,937,875
[45] Feb. 10, 1976

[54] SYSTEMS FOR ELIMINATING HIGH-FREQUENCY DISTURBANCES IN TELEVISION CAMERAS

[75] Inventors: Mohamed Marey, Gross-Gerau; Klaus Pollath, Nieder-Ramstadt, both of Germany

[73] Assignee: Robert Bosch G.m.b.H., Stuttgart, Germany

[22] Filed: Aug. 15, 1974

[21] Appl. No.: 497,705

[30] Foreign Application Priority Data
Sept. 1, 1973 Germany............................ 2344154

[52] U.S. Cl. .................................................. 178/7.2
[51] Int. Cl.² ........................................... H04N 5/21
[58] Field of Search ...... 178/7.2, DIG. 12; 325/488, 325/380

[56] References Cited
UNITED STATES PATENTS

| | | | |
|---|---|---|---|
| 2,687,514 | 8/1954 | Roberts............................ | 325/488 X |
| 3,046,333 | 7/1962 | Gebel................................ | 178/7.2 |
| 3,153,171 | 10/1964 | Poole et al...................... | 178/7.2 X |
| 3,238,295 | 3/1966 | Meinl et al....................... | 178/7.2 |

*Primary Examiner*—Richard Murray
*Assistant Examiner*—Mitchell Saffian
*Attorney, Agent, or Firm*—Littlepage, Quaintance, Murphy & Dobyns

[57] ABSTRACT

Superimposed pictures on the video outputs of cameras resulting from picking up stray transmitted television signals are eliminated by shielding the camera amplifier, and by insertion of inductances at the input of the amplifier and between the first two stages. The inductances combine with existing parasitic capacitances to create low-pass filters which pass the video signal from the camera but block the higher frequency transmitted television signals.

4 Claims, 2 Drawing Figures

SYSTEMS FOR ELIMINATING HIGH-FREQUENCY DISTURBANCES IN TELEVISION CAMERAS

BACKGROUND OF THE INVENTION

1. Field of the Invention

The invention relates to a device for eliminating high-frequency (hf) disturbances in television cameras, especially radio frequency disturbances such as video signals produced outside the camera which stray into the camera.

2. Description of the Prior Art

In the operation of television cameras outside the studio, it frequently happens that transmitters located near the camera cause disturbances in the video channel of the camera. When these transmitters are television transmitters, this disturbance causes the picture transmitted by the transmitter to be superimposed upon the picture taken by the camera, whereby the picture quality suffers.

SUMMARY OF THE INVENTION

The invention aims therefore at creating a device whereby such disturbances in the television camera are suppressed.

According to the invention, a low-pass filter in each case is arranged between the signal electrode of the television camera tube and the input electrode of the first video amplifier stage, which receives the signal from the camera tube. A low-pass filter is also arranged between the output electrode thereof and the input of the following amplifier stage. The low-pass filter consists of an inductive reactance and the existing parasitic capacitances and has a cutoff frequency above the frequency of the video intelligence signal, but below that of the transmitted signal, and preferably between 10 and 20 MHz, and the input amplifier is completely blocked off.

The arrangement of the invention has the advantage that even in the case of camera shots near strong transmitters, disturbances are no longer visible on the picture screen of the control monitor.

BRIEF DESCRIPTION OF THE DRAWINGS

The invention will now be explained in greater detail by means of an embodiment represented in FIGS. 1 and 2, wherein only the parts necessary for the understanding of the invention are drawn.

DESCRIPTION OF THE PREFERRED EMBODIMENT

Figure 1:
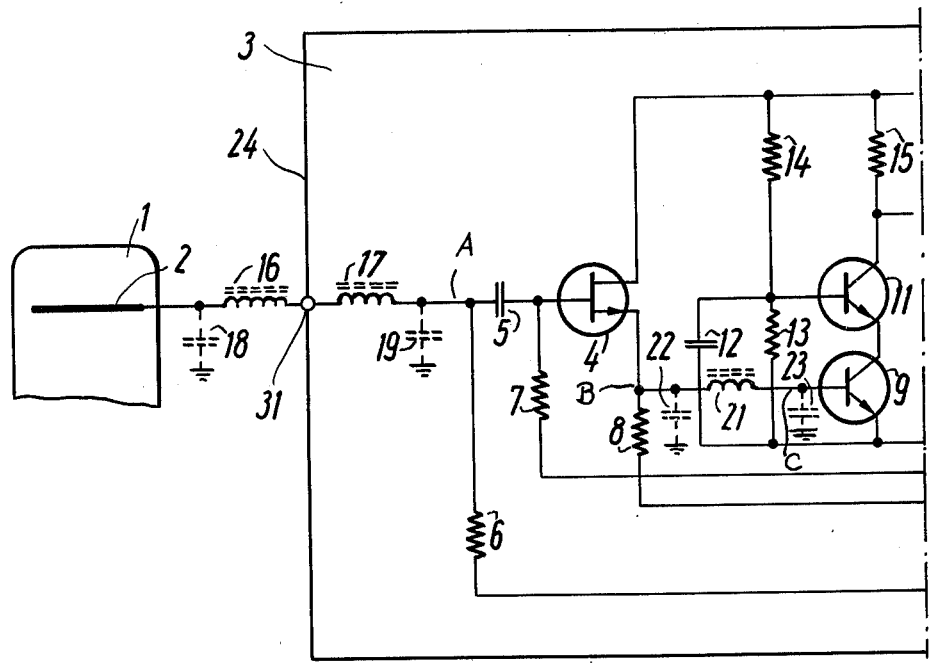
FIG. 1 illustrates a circuit diagram of a device according to the invention.

FIG. 1 shows a television camera tube 1 in brokenoff illustration. An input video amplifier 3 (likewise in broken-off illustration) is connected to the signal electrode 2 to amplify the video signal from the camera tube. The input amplifier 3 consists, as is known, essentially of an input field-effect transistor (FET) 4 with the conventional circuit elements 5 to 8 appertaining thereto as a first stage, and a subsequent cascode amplifier with transistors 9 and 11, and conventional circuit elements 12 to 15 appertaining thereto as a second stage. Terminals A and B are respectively the input and output terminals of the first stage, and terminal C is the input terminal of the second stage. The output of the second stage is used in any conventional manner.

According to the invention a two-part coil 16 and 17 is provided between signal electrode 2 and the input electrode of the FET 4, which elements, together with the parasitic capacitances 18 and 19 (such as capacitance of signal electrode 2, circuit capacitances, input capacitance of the FET 4) form a low-pass filter of such value that only the video intelligence signal can pass unimpeded, while any signal of higher frequency is suppressed. Another coil 21 is provided between the output of the FET 4 and the input of the cascode amplifier transistors 9 and 11, which elements, together with the parasitic capacitances 22 and 23 form another low-pass filter of the same value. A frequency of 15 MHz was chosen as the cutoff frequency of the two low-pass filters. In order also to avoid straying by hf disturbances upon other parts of the input amplifier 3, the amplifier, according to the invention, is completely blocked off from hf disturbances by being placed in a totally sealed small metal box 24.

Figure 2:
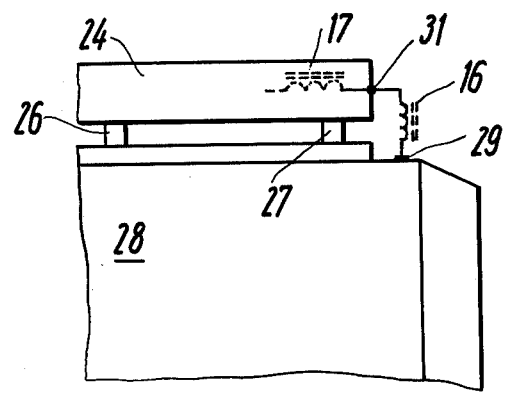
FIG. 2 illustrates a structural development of the device according to the invention.

In FIG. 2, metal box 24 is fastened, by means of spacers 26 and 27 on the blocked-off coil set 28 of the television camera tube. Coil 16, which is positioned outside box 24 is arranged with feed lines as short as possible between a terminal 29 of the television camera tube and a duct 31 in the front wall of box 24.

What is claimed is:

1. In a television camera system comprising a television camera tube with a signal electrode for providing a video signal, a first amplifier stage having an input terminal and connected for receiving and for amplifying the video signal to provide an amplified video signal at a first stage output terminal, and a second amplifier stage having a second stage input terminal for receiving the amplified video signal from the first stage output terminal and for further use in any conventional manner, and wherein there are parasitic capacitances to ground respectively from the signal electrode, the first stage input terminal, the first stage output terminal, and the second stage input terminal, the improved system for eliminating the effects of stray transmitted television signals from the amplified video signal comprising:

A. a first inductance inserted between the signal electrode and the first stage input terminal and forming, together with the parasitic capacitances to ground respectively from the signal electrode and from the first stage input terminal, a first low-pass filter having a cutoff frequency above the frequency of the video signal but below the frequency of the stray transmitted television signals, B. a second inductance inserted between the first stage output terminal and the second stage input terminal and forming, together with the parasitic capacitance to ground respectively from the first stage output terminal and the second stage input terminal, a second low-pass filter having a cutoff frequency above the frequency of the video signal but below the frequency of the stray transmitted television signals, and C. A shield means for completely blocking off the amplifier stages from stray transmitted television signals.

2. A system according to claim 1 wherein the first and the second low-pass filters each have a cutoff frequency between 10 and 20 MHz.

3. A system according to claim 2, wherein the first inductance is in the form of a two-part coil, one part of which is situated outside the shield means and connected to the signal electrode, and the other part of which is situated inside the shield means and connected to the first stage input terminal.

4. A system according to claim 3 wherein the shield means comprises a sealed metal box.

* * * * *